(12) United States Patent
Maguire

(10) Patent No.: US 9,008,114 B2
(45) Date of Patent: Apr. 14, 2015

(54) SYSTEM AND METHOD FOR DISTANCE-DEPENDENT DATA EXCHANGE BETWEEN WIRELESS COMMUNICATION DEVICES

(71) Applicant: Yael Maguire, Boston, MA (US)

(72) Inventor: Yael Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 71 days.

(21) Appl. No.: 13/735,783

(22) Filed: Jan. 7, 2013

(65) Prior Publication Data

US 2013/0182641 A1    Jul. 18, 2013

Related U.S. Application Data

(60) Provisional application No. 61/585,691, filed on Jan. 12, 2012.

(51) Int. Cl.
| | |
|---|---|
| *H04J 3/00* | (2006.01) |
| *H04J 3/16* | (2006.01) |
| *H04W 8/00* | (2009.01) |
| *H04W 28/18* | (2009.01) |
| *H04W 52/28* | (2009.01) |
| *H04W 8/08* | (2009.01) |
| *H04W 8/14* | (2009.01) |
| *H04W 52/24* | (2009.01) |

(52) U.S. Cl.
CPC ............... *H04W 8/00* (2013.01); *H04W 8/005* (2013.01); *H04W 8/08* (2013.01); *H04W 8/14* (2013.01); *H04W 28/18* (2013.01); *H04W 52/247* (2013.01); *H04W 52/281* (2013.01); *H04B 17/318* (2015.01)

(58) Field of Classification Search
CPC ......... H04W 8/00; H04W 8/005; H04W 8/08; H04W 8/14
USPC .................................................. 370/464–465
See application file for complete search history.

(56) References Cited

U.S. PATENT DOCUMENTS 7,583,975 B2 *   9/2009   Stephens et al. ............... 455/522
7,725,584 B1 *   5/2010   Hanmann et al. .............. 709/227
(Continued)

FOREIGN PATENT DOCUMENTS

WO    WO 2014/107699    7/2014

OTHER PUBLICATIONS

International Search Report and Written Opinion for International Application PCT/US2014/0010415, May 7, 2014.
(Continued)

*Primary Examiner* — Farah Faroul
(74) *Attorney, Agent, or Firm* — Baker Botts L.L.P.

(57) ABSTRACT

In one embodiment, a method includes identifying a plurality of data types; identifying a plurality of communication ranges for data transmission, wherein a first communication range of the plurality of communication ranges is less than a second communication range of the plurality of communication ranges, and wherein the first communication range corresponds to a first data type of the plurality of data types and the second communication range corresponds to a second data type of the plurality of data types; transmitting data in the first data type to a first wireless communication device located within the first communication range; and transmitting data in the second data type to a second wireless communication device located within the second communication range.

31 Claims, 9 Drawing Sheets

(56) References Cited

U.S. PATENT DOCUMENTS

| | | |
|---|---|---|
| 8,000,314 B2 | 8/2011 | Brownrigg |
| 8,023,929 B2 | 9/2011 | Mgrdechian |
| 8,554,873 B1 | 10/2013 | Ganesh |
| 2005/0078682 A1* | 4/2005 | Kim et al. ............. 370/395.5 |
| 2005/0174975 A1 | 8/2005 | Mgrdechian |
| 2005/0185669 A1* | 8/2005 | Welborn et al. .......... 370/465 |
| 2006/0111139 A1 | 5/2006 | Kitajima |
| 2007/0206542 A1* | 9/2007 | Proctor, Jr. .............. 370/335 |
| 2008/0208971 A1 | 8/2008 | Costin |
| 2009/0005102 A1* | 1/2009 | Das et al. ................ 455/522 |
| 2009/0164309 A1 | 6/2009 | Mgrdechian |
| 2009/0257405 A1* | 10/2009 | Stamoulis et al. ........ 370/332 |
| 2009/0312033 A1 | 12/2009 | Shen |
| 2010/0077045 A1 | 3/2010 | Bercu |
| 2010/0272059 A1* | 10/2010 | Bienas et al. ............ 370/330 |
| 2011/0154014 A1 | 6/2011 | Thurn |
| 2011/0197239 A1* | 8/2011 | Schlack ................... 725/95 |
| 2012/0109830 A1 | 5/2012 | Vogel |
| 2012/0110642 A1 | 5/2012 | Grassel |
| 2012/0184327 A1* | 7/2012 | Love et al. .............. 455/552.1 |
| 2012/0281704 A1* | 11/2012 | Butterworth et al. ..... 370/395.4 |
| 2012/0316967 A1 | 12/2012 | Mgrdechian |
| 2012/0329554 A1 | 12/2012 | Mgrdechian |
| 2013/0003594 A1* | 1/2013 | Amano et al. ............ 370/252 |
| 2013/0198383 A1 | 8/2013 | Tseng |
| 2014/0196116 A1 | 7/2014 | Maguire |

OTHER PUBLICATIONS

Non-Final Office Action for U.S. Appl. No. 13/735,938, Oct. 24, 2014.

Notice of Allowance for U.S. Appl. No. 13/735,938, Jan. 21, 2015.

* cited by examiner

SYSTEM AND METHOD FOR DISTANCE-DEPENDENT DATA EXCHANGE BETWEEN WIRELESS COMMUNICATION DEVICES

PRIORITY

This application claims the benefit, under 35 U.S.C. §119 (e), of U.S. Provisional Patent Application No. 61/585,691, filed on 12 Jan. 2012, which is incorporated herein by reference.

TECHNICAL FIELD

This disclosure generally relates to transmitting data between wireless devices.

BACKGROUND

Conventional radios utilize radio metrics to adjust the rate of transfer of information from one source to another. The radio metrics may be, for example, BER (Bit Error Rate) and RSSI (Received Signal Strength Indication). The metrics are typically found in WLAN (Wireless Local Area Network) and WAN (Wide Area Network) networks such as 3G, LTE (Long Term Evolution), CDMA (Code Division Multiple Access), and WiFi systems. In these systems, the rate at which a wireless device can exchange data with another wireless device is proportional to the distance between the wireless devices. For example, the shorter the distance between the wireless devices, the faster the transmission of data between the wireless devices. Thus, the rate of data transmission changes relative to the distance between the wireless devices exchanging data. The data remains the same regardless of the distance between the wireless devices, and thus the time it takes to transfer the data increases as the distance between the devices increases.

SUMMARY OF PARTICULAR EMBODIMENTS

According to one aspect, systems and methods are provided for providing data that is adjusted according to the distance between wireless devices exchanging the data. In one embodiment, spatial zones of information are created as a function of the distance between wireless devices. In one example, data to be transmitted from a first wireless device to a second wireless device is adjusted based on which spatial zone of information the second wireless device is located in.

In some embodiments, a first wireless device may transmit data that can only be received by one or more second wireless devices within a specific distance from the first wireless device. Those wireless devices beyond the specific distance from the first wireless device are not able to receive the data. There may be different types of data associated with different distances.

DESCRIPTION OF EXAMPLE EMBODIMENTS

Figure 1:
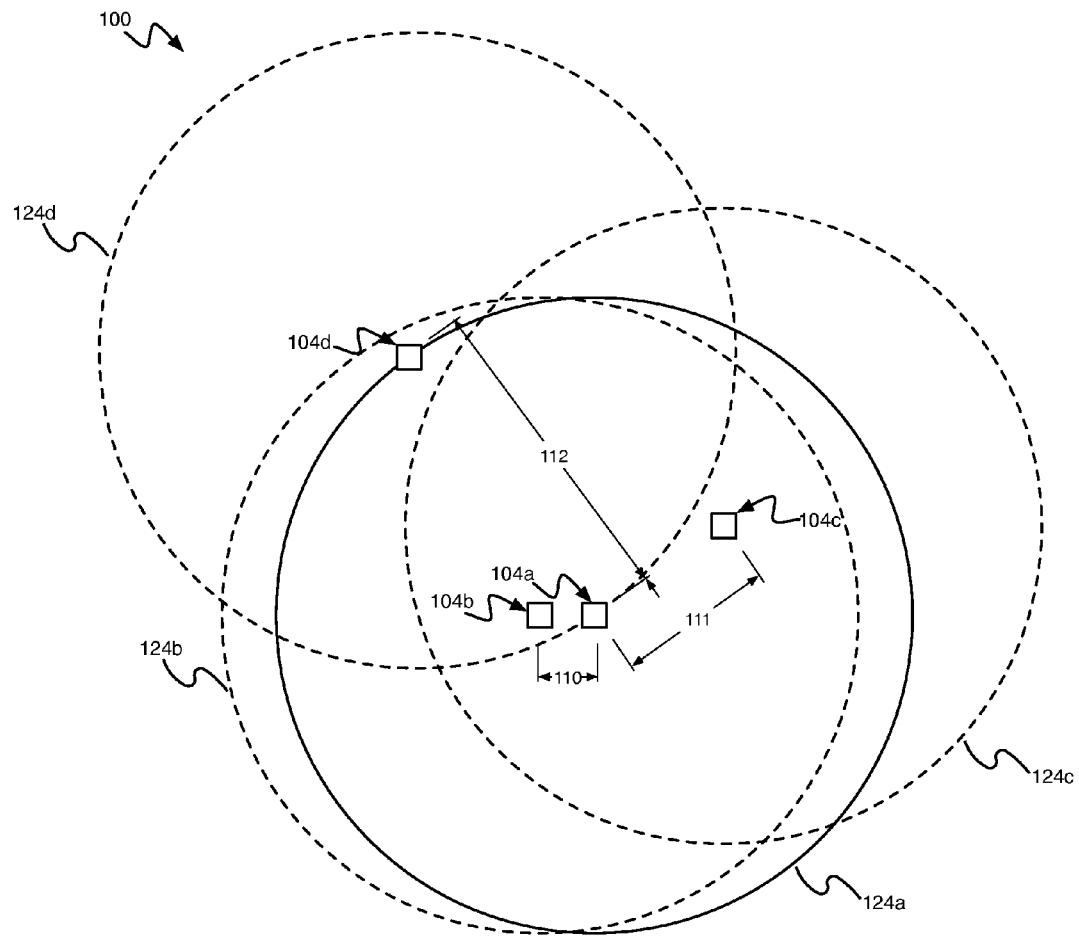
FIG. 1 illustrates an example wireless communications system.

FIG. 1 is a diagram of a communications system 100. The communication system 100 includes wireless communication devices 104a, 104b, 104c and 104d. The first wireless communication device 104b is a first distance 110 from the primary wireless communication device 104a. The second wireless communication device 104c is a second distance 111 from the primary wireless communication device 104a. The third wireless communication device 104d is a third distance 112 from the primary wireless communication device 104a. In a conventional wireless communications system, the wireless communication devices 104b, 104c and 104d are within a range of communication 124a of the primary wireless communication device 104a, and if data sharing is enabled on the primary wireless communication device 104a, then all wireless communication devices 104b-104d within the range of communication 124a have access to the same data.

The range of communication 124a may depend on the wireless technology for data transmission used by the primary wireless communication device 104a. Examples of wireless communications technologies include Near Field Communications (NFC), Bluetooth, WiFi, and a cellular network such as GSM, 3G, 4G or LTE. If a wireless communication device 104b-104d is inside the communication range 124a of the primary wireless communication device 104a, then the wireless communication devices 104b-104d can exchange data with the primary communication device 104a. The first distance 110 between the primary communication device 104a and the first communication device 104b is the shortest, and in some embodiments, this would allow communication between the wireless communication devices 104a and 104b at the highest available throughput. The second distance 111 is greater than the first distance 110, and thus the second wireless communication device 104c may have a lower available throughput. However, since the second wireless communication device 104c is within the communication range 124a, the second wireless communication device 104c maintains access to the same data as the first wireless communication device 104b. Furthermore, the third distance 112 is greater than the second distance 111, so the third wireless communication device 104d may have the lowest available throughput. However, since the third wireless communication device 104d also remains within the communication range 124a, the third wireless communication device 104d maintains access to the same data as the first 104b and second 104c wireless communication devices. In one example, these embodiments would be typical of a WiFi system in which the communication ranges 124a, 124b, 124c, and 124d have a radius of about one hundred meters and the distances 110, 111, and 112 are less than about 100 meters in an indoor and/or multipath environment.

According to various embodiments, the wireless communication devices 104a-104d may include one more mobile phones, iPhones, headphones, headsets (including a microphone and earphone), music players, iPods, personal digital assistants, iPads, laptops, computers, tablet computers, or cameras.

Figure 2:
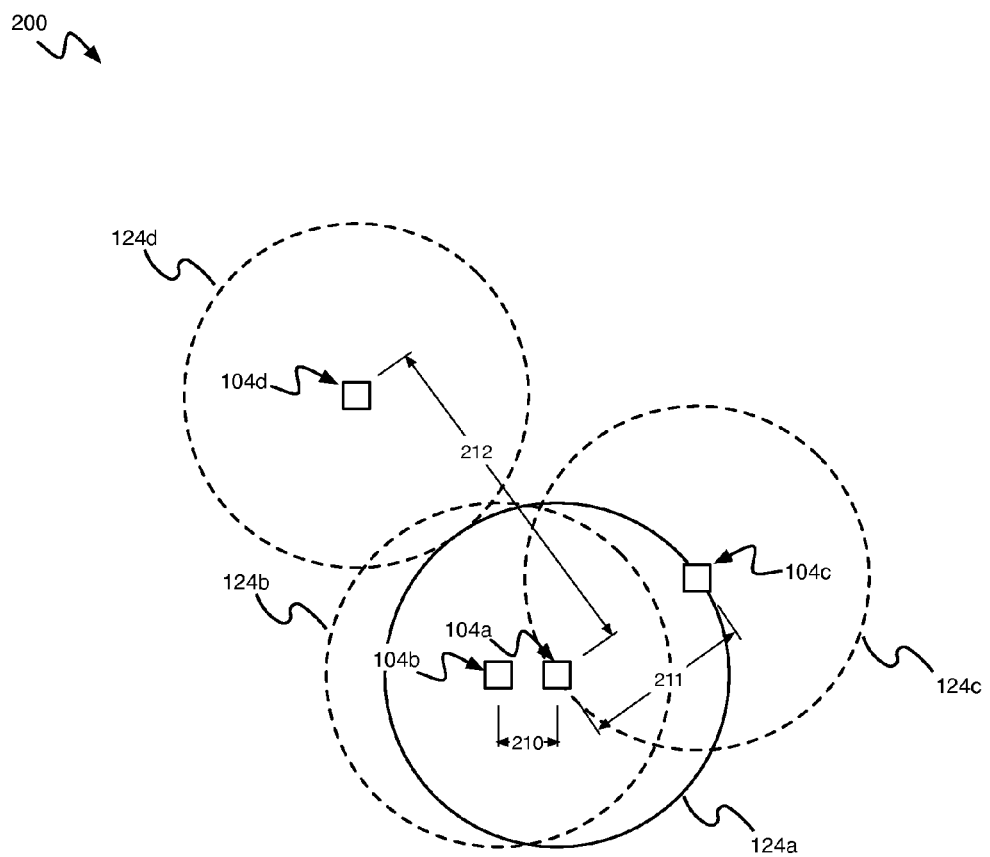
FIG. 2 illustrates an example wireless communications system including wireless devices positioned at different distances.

FIG. 2 is a diagram of a communications system 200. The wireless communication devices 104b, 104c, and 104d are at different distances 210, 211 and 212 from the user 104a. As shown in FIG. 2, the third wireless communication device 104d is unable to communicate with the primary communication device 104a since the distance 212 between the communication devices 104a and 104d is too large and the primary communication range 124a does not overlap with the third communication range 124d. The wireless communication devices 104b and 104c are within the communication range 124a, and are able to communicate with the communication device 104a, as described above with respect to FIG. 1. In this embodiment, the third wireless communication device 104d is not able to access information from the primary wireless communication device 104a due to a distance-dependent threshold in communication.

Figure 3:
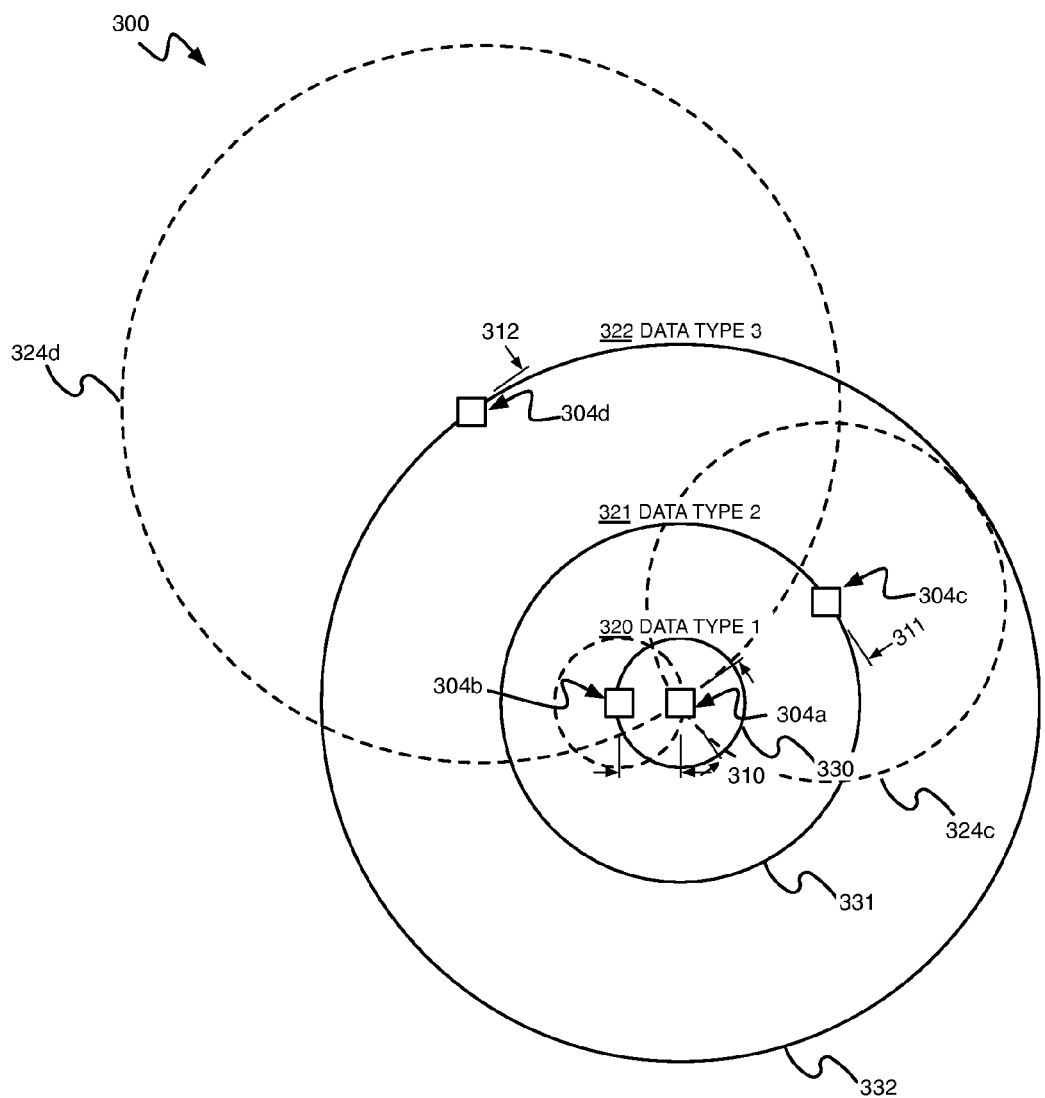
FIG. 3 illustrates an example wireless communications system for wirelessly transmitting data between wireless devices.

FIG. 3 is a diagram of a communications system 300 according to one embodiment. According to one aspect, the communication device 304a simultaneously transmits multiple data streams each having different types of coded data. The communication device 304a has three levels of communication ranges, 330, 331, 332. The communication range 330 includes transmitted data included in the first data type 320. The communication range 331 includes transmitted data included in the second data type 321. The communication range 332 includes transmitted data included in the third data type 322. The type of data that may be transmitted from the primary communication device 304a depends on the distance between the primary communication device 304a and the device to which it is attempting to transmit data. For example, data included in the first data type 320 may be transmitted to devices within the first communication range 330, data included in the second data type 321 may be transmitted to devices within the second communication range 331, and data included in the third data type 322 may be transmitted to devices within the third communication range 332.

In some embodiments, the data types 320, 321 and 322 may be transmitted simultaneously on different radios operating at different electromagnetic wavelengths, different antennas, and/or different modulation, demodulation and encoding formats. Different modulation, demodulation and encoding formats may be used to minimize the hardware complexity of the primary wireless communication device 304a. In one example, the first wireless communication device 304b at communication distance 310 has access to the first data type 320, the second data type 321 and the third data type 322. The second wireless communication device 304c at communication distance 311 has access to the second data type 321 and the third data type 322. The third wireless communication device 304d at communication distance 312 has access to the third data type 322. The user of the primary wireless communication device 304a may control the type of information provided at each data type level 320, 321 and 322. In one example, the user interface of the wireless communication device 304a may be designed to allow the user to control the type of information available at each data type level 320, 321 and 322.

In FIG. 3, the communication range 330 is shorter than the communication range 331, which in turn is shorter than the communication range 332. In some embodiments, when the first data type 320 is transmitted from the communication device 304a, only the communication device 304b can receive it because only the communication device 304b is within the communication range 330. However, when the second data type 321 is transmitted from the communication device 304a, both of the communication devices 304b and 304c can receive it because both of the communication devices 304b and 304c are within the communication range 331. Similarly, when the third data type 322 is transmitted from the communication device 304a, all three of the communication devices 304b, 304c, and 304d can receive it because all three of the communication devices 304b, 304c, and 304d are within the communication range 332.

In some embodiments, the information provided in the first data type 320 may be more private or secure than information provided in the second data type 321, and the information provided in the second data type 321 may be more private or secure than information provided in the third data type 322. In accordance with one embodiment of the invention, the radius 310 of the first communication range 330 may be less than about one meter and the first data type 320 may be very personal information such as contact information, private documents and files, or URLs to personal or public information on the internet. The data included in the first data type 320 may be information that the user of the primary communication device 304a intentionally shares specifically with the user of the first communication device 304b. To further improve security, users of the wireless communication devices 304a and 304b enable exchange of information in the first data type 320 only after first sharing other information such as device orientation, inertial signatures, passwords, PINS (personal identification numbers), NFC, or RFID data exchange. In one example, the first wireless communication device 304b may be another wireless device owned by the user of the primary communication device 304a such as a watch, pedometer, heart rate monitor, fitness equipment or headphones, or any combination of these.

In one embodiment, the radius 311 of the second communication range 331 may be less than three meters and the second data type 321 may be personal information that the user of the primary communication device 304a intends to share with a group of people. For example, the information in the second data type 321 may be contact information, documents, and/or files or URLs to personal or public information on the internet. The information in the second data type 321 may be information that is often inefficiently shared at business meetings and social gatherings.

The radius 312 of the third communication range 332 may be greater than ten meters and the third data type 322 may be public information that the user of the primary communication device 304a intends to share broadly in a large public setting. For example, the information included in the third data type 322 may be information the user of the primary communication device 304a intends to share with other communication devices in a classroom, lecture hall, airplane, restaurant or bar, urban outdoor environment, and/or mall. In another example, the information in the third data type 322 may be information the user of the primary communication device 304a would like to share with any device within the selected range, such as any device within ten meters of the primary communication device 304a while the user ambulates outside.

Figure 4:
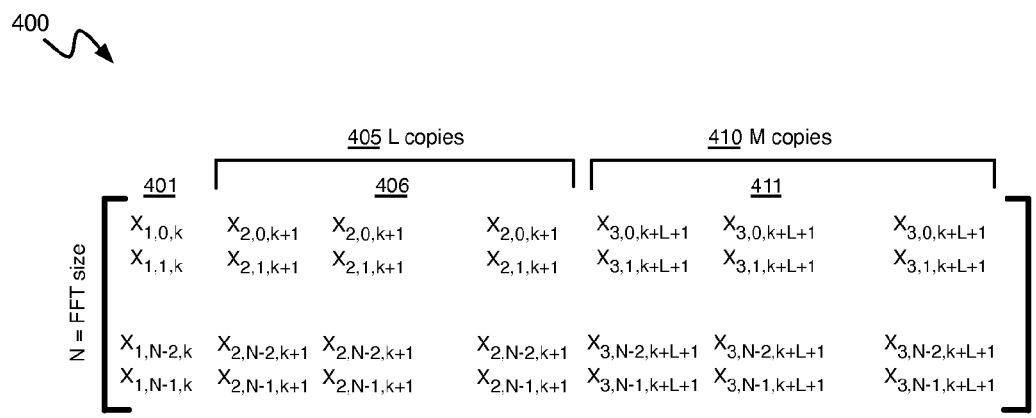
FIG. 4 illustrates an example data encoding matrix.

FIG. 4 is a diagram of an embodiment of a data encoding matrix 400 that may be used to create the three different data types 320, 321 and 322 shown in FIG. 3. FIG. 4 shows a matrix of the three data types 320, 321 and 322 in bits that may be fed into a transmitter, such as an Orthogonal Frequency Division Multiplexing (OFDM) transmitter. The first data type 320 is represented in first column 401, the second data type 321 is represented in a second set of columns 406, and the third data type 322 is represented in a third set of columns 411.

Referring to FIG. 4, the first data type 320 is shown as a first column 401 vector of N bits. The second data type 321 is shown as L redundant copies 405 of one column vector of the second set of columns 406. The third data type 322 is shown as M redundant copies 410 of one column vector of the third set of columns 411. According to one example, if the entries in the second set of columns 406 are all identical, the bandwidth of the second data type 321 can be reduced to N×L times lower than the bandwidth of the first data type 320. According to one feature, as shown in FIG. 3, the third data type 322 is broadcast at a longer range than the second data type 321, and, referring to FIG. 4, the number of redundant copies 410 (M) of the third data type 322 is larger than the number of redundant copies 405 (L) of the second data type 321.

According to one embodiment, a data stream from a wireless communication device is a continuous stream of matrices 400. In the matrix 400, k represents the time index. A transceiver in the wireless communication device includes an encoding module that may use an OFDM encoding method. The OFDM encoding method converts a parallel bit stream to a set of orthogonal signals. The transceiver simultaneously transmits the set of orthogonal signals. In one example, the transceiver includes a linear analog transmitter that performs the simultaneous transmission of the set of orthogonal signals. According to one embodiment, the set of orthogonal signals is created using non-overlapping or minimally-overlapping signals in the frequency domain, resulting in orthogonal frequency data. A Fast Fourier Transform (FFT) may be used to convert the superposition of orthogonal frequency data into the time-domain.

In one embodiment, distance-dependent data is generated by adjusting the bandwidth of a bit of data for each data type. For example, the shortest distance data type, the first data type 320, uses a high bandwidth, while the longest distance data type, the third data type 322, uses a low bandwidth. In one embodiment, the bandwidth may be reduced by making redundant copies of the same bit and designing the receiver to integrate or average the signals. The low bandwidth signal used for the third data type 322 allows the data to be received at a distance further from the transmitter. The signals may be averaged in the time domain or the signals may be averaged in the frequency domain. In one example, the receiver has information about which receiver signals to average. The information about which signals to average may have been previously shared with the wireless communication device to which the transceiver will transmit the data or from which it is receiving a signal. In another embodiment, distance-dependent data is generated by adjusting the transmit power for each data type.

In one embodiment, the data in the matrix 400 may be more interleaved than is shown in FIG. 4. In other embodiments, the data in the matrix 400 may be represented in different encodings or modulation formats to minimize latency or optimize some other system parameter. In a further embodiment, the value of L (the number of copies 405) and the value of M (the number of copies 410) may be fixed a priori information shared across the wireless communications devices 304a, 304b, 304c and 304d. In another embodiment, the value of L (the number of copies 405) and the value of M (the number of copies 410) may be broadcast as third data type 322 information or by means of another wireless protocol with a longer range.

Figure 5A:
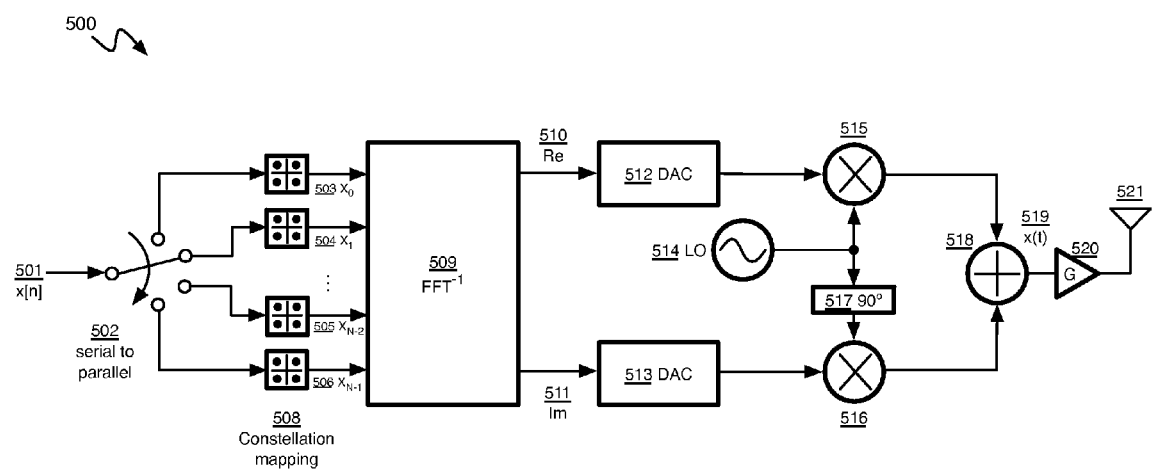
FIG. 5A illustrates an example orthogonal frequency division multiple access (OFDM) transmitter.
Figure 5B:
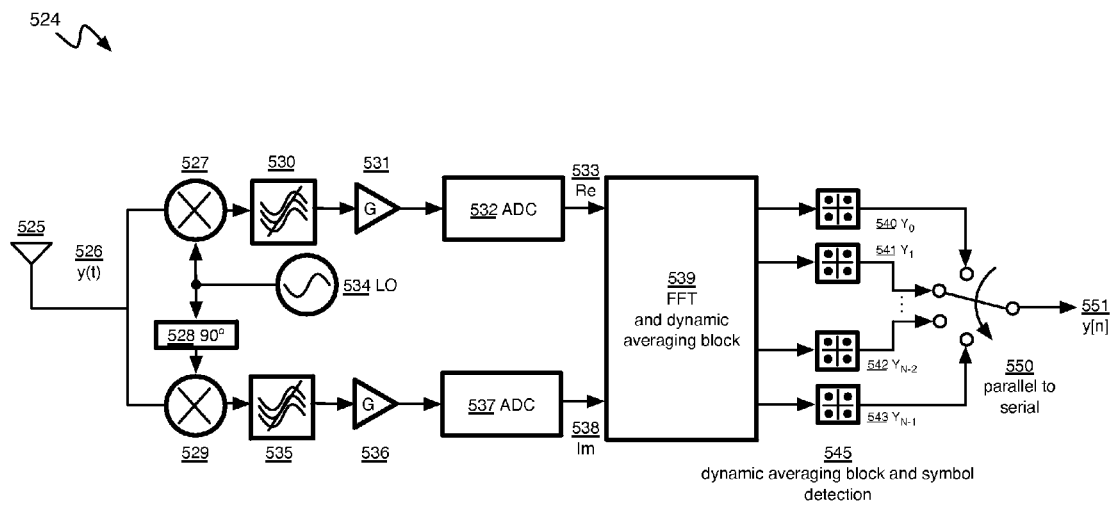
FIG. 5B illustrates an example OFDM receiver.

FIG. 5A is a diagram of an OFDM transmitter 500 according to an embodiment, and FIG. 5B is a diagram of an OFDM receiver 524 according to an embodiment. According to one aspect, an OFDM transceiver includes the OFDM transmitter of FIG. 5A and the OFDM receiver of FIG. 5B.

Referring to FIG. 5A, an incoming data stream x[n] 501 may be, for example, a serialized version of the matrix shown in FIG. 4. The incoming data stream x[n] 501 is converted into multiple parallel data streams 502, and a constellation mapping 508 is used to map the parallel data streams 502 to a constellation of orthogonal signals 503, 504, 505, and 506. In one example, the orthogonal signals 503-506 may be modulated using QAM (Quadrature Amplitude Modulation) or PSK (Phase Shift Keying).

The orthogonal signals 503-506 are converted to time domain signals using an inverse Fast Fourier Transform 509 (FFT). The FFT 509 produces a complex time-series signal including a real signal component 510 and an imaginary signal component 511. The real signal component 510 is input converted to an analog signal at a first digital-to-analog converter 512, and the imaginary signal component 511 is converted to an analog signal at a second digital-to-analog converter 513. The real signal component 510 is then converted to the radiofrequency (RF) domain via a first mixer 515 and the imaginary signal component 511 is converted to the radiofrequency domain via a second mixer 516. The mixers 515 and 516 receive a local oscillator signal from the local oscillator 514, and multiply the local oscillator signal by the respective real and imaginary complex time series signals. In one example, the local oscillator signal is in the range of about 2.45 GHz, and the output from the transmitter is WiFi or another microwave frequency. The real 510 and imaginary 511 components are combined at 518 to produce the output signal x(t) 519. The output signal x(t) 519 is amplified by amplifier 520 and radiated by an antenna 521 as microwave electromagnetic fields. In one example, the matrix 400 in FIG. 4 may be fed into the transmitter 500 column-by-column to transmit the various data types.

Referring to FIG. 5B, the receiver 524 includes an antenna 525 that converts electromagnetic fields to a voltage signal y(t) 526. The voltage signal y(t) may be an attenuated and distorted version of an output signal from another wireless communication device, similar to the output signal x(t) 519 of the transmitter. The attenuation and distortion of the output signal as received at the receiver 524 may be caused by path loss and/or scattering in the environment. The received voltage signal y(t) is divided into two parallel input signals and input into mixers 527 and 529. The mixers 527 and 529 convert the parallel input signals to baseband using a local oscillator 534. Baseband filters 530 and 535 filter out the double frequency component of each parallel input signal. The output from the baseband filters 530 and 535 is amplified at amplifiers 531 and 536, and then the complex analog time-series input signals are converted to the digital domain with analog-to-digital converters 532 and 537.

The complex digital time-series input signals are processed by the FFT 539. In one embodiment, the FFT 539 averages the samples in the complex digital time-series input signals according to a shared a priori knowledge of the indices L and M, as discussed above with respect to FIG. 4. In one example, the FFT 539 includes sufficient memory to store received samples for averaging. According to one example, the matrices are framed. The FFT 539 outputs orthogonal signals that are converted to symbols by the symbol detection block 545. In another embodiment, the symbol detection block 545 averages the samples in the complex digital time-series input signals according to a shared a priori knowledge of the indices L and M, as discussed above with respect to FIG. 4. The symbol detection block 545 may include sufficient memory to store received samples for averaging. According to one feature, the averaging performed by the FFT 539 or the symbol detection block 545 results in a processing gain, allowing for the use of a smaller bandwidth for a longer range. After appropriate averaging, the symbol detection block 545 detects the symbols and converts the signals to bits. The multiple parallel orthogonal signals 540-543 are converted from parallel to a serial stream of bits y[n] 551.

Figure 5C:
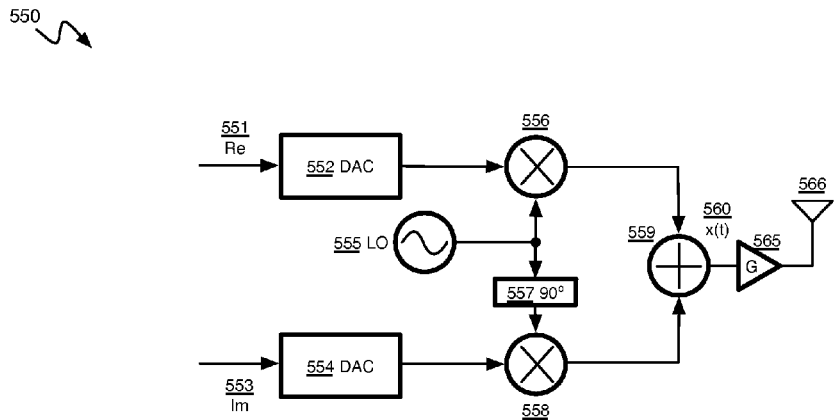
FIG. 5C illustrates an example simple superheterodyne transmitter.
Figure 5D:
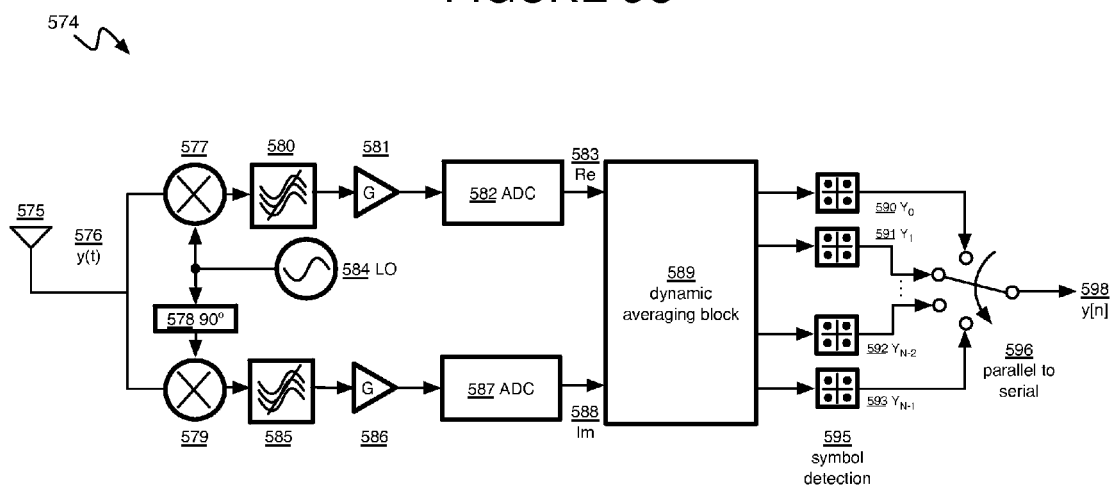
FIG. 5D illustrates an example simple superheterodyne receiver.

In some instances, radios may have transceiver architectures that are simpler than OFDM. Examples include RFID at UHF and microwave frequencies, Bluetooth Low Energy 4.0, Bluetooth 1.0, 1.1, 1.2, 2.0, 2.1 (Classic Bluetooth), the earlier WiFi protocols (802.11b and g) and proprietary 433, 900 MHz and 2.4 GHz radios. In these instances, the size of the orthogonal basis set may be smaller, and therefore the encoding for distance-dependent communications may be different. For example, if the modulation is done with ASK, FSK (including GFSK, DQPSK and DPSK), the distance-dependent coding may be done with repetition codes, dynamically changing rate codes, or other codes. FIGS. 5C and 5D illustrate a conventional radio architecture which may be used for active radio systems that are not based on RFID (the complexity of the RFID antenna arrangement for transmit 566 and receive 575 are different, but not shown in these figures for sake of simplicity). For the transmitter 550, digital samples representing baseband modulation in the real 551 and imaginary domain 553 are fed into DACs 552 554 which are then modulated with a local oscillator 555, mixers 556 558, and a phase shifter 557 and then combined 559 to produce a complex RF signal 560. This signal can then be amplified 565 and radiated 566. The baseband samples 551 553 may correspond to samples that compose repetition or modulation rates codes for each distance-dependent communication range. Upon reception of a radiated signal at the antenna 575, a complex RF signal 576 is demodulated and filtered by components 577 578 579 580 584 585. The analog signal is amplified 581 586 and then digitized 582 587. If a repetition code or similar coding scheme is utilized, a dynamic averaging block 589 may be used to assemble larger symbols from individual samples or chips. If a different modulation rate is used, the dynamic averaging block 589 may choose larger symbols to apply an appropriately-sized matched filter or other filter. Finally, a symbol detection block 595 extracts bits from the sequence, which may then be converted into a bit stream in memory.

Figure 6:
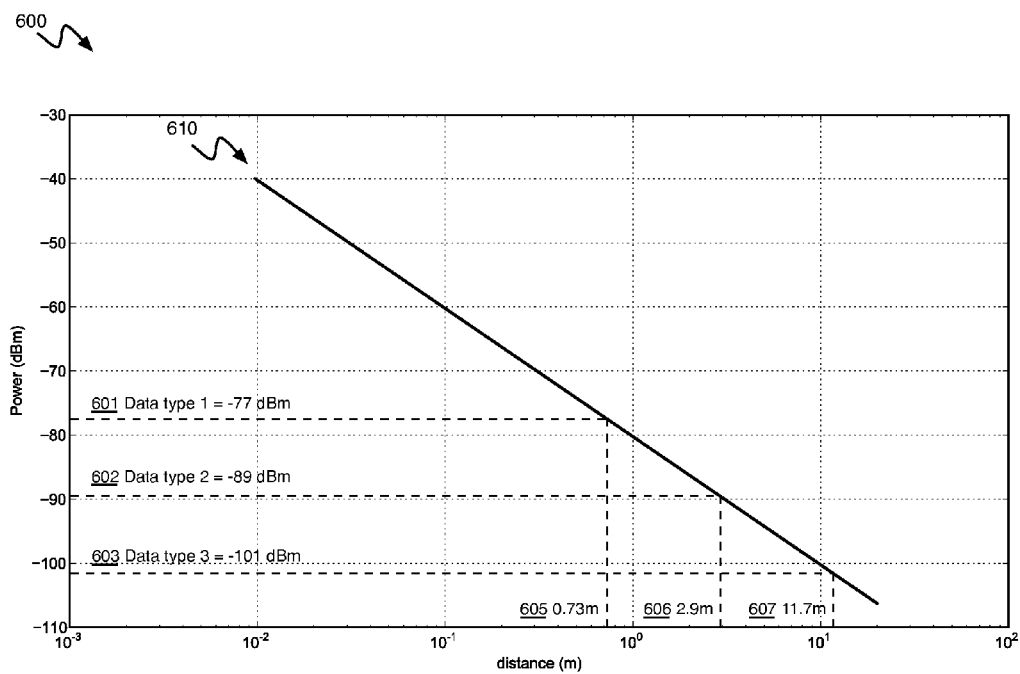
FIG. 6 illustrates transmit power at various distances.

FIG. 6 is a diagram showing the transmit power at various distances for a matrix such as that shown in FIG. 4 with N×L=16 and N×M=256. The combined transmit power and antenna gain of the originating wireless communication device's transmitter is set to −40 dBm, allowing for communication of the first data type 601 at a first distance d1 605 (0.73 m), communication of the second data type 602 at a second distance d2 606 (2.9 m), and communication of the third data type 603 at a third distance d3 607 (11.7 m) with a 300 Mbit/s OFDM transceiver. Communication of different data types at different distances may be enabled digitally if, for example, the transmitter has sufficient dynamic range. In another example, communication of different data types at different distances may be enabled digitally with an analog attenuator in the transmit chain. According to one feature, the low power level may be selected to ensure privacy. For example, if users of other wireless communication devices do not change the temperature of their receivers or employ enormously large, conspicuous antennas, it is thermodynamically not possible to decode data beyond a certain range. This is because, according to equation (1) below, there is a minimum signal to noise ratio beyond which no information can be reliably obtained:

$$SNR_{min\_in\_dB}=10 \log_{10}k_BT+10 \log_{10}BW+Eb/N_{0BER}+NF+IL_{modulation}. \quad (1)$$

The first term represents the noise floor in the channel based on the thermodynamics of operating a receiver at a particular temperature. The second term represents how much of the channel is utilized as bandwidth for integrating the noise power. The third term is the theoretical signal to noise ratio in dB for a specific bit error rate (BER) and modulation format. The theoretical signal to noise ratio for a specific BER and modulation format is −1.6 dB at the Channel capacity limit, but is otherwise a positive number. The fourth term represents an implementation loss in the analog domain of a circuit corresponding to the noise temperature of the receiver and is typically in the range of about 0.5-20 dB. The last term is a digital implementation loss corresponding to, for example, finite dynamic range, computational power, distortion/interference and timing errors. The digital implementation loss varies from about 0.5-10 dB in typical systems. Given that NF and IL are positive numbers, the variables under a receiving user's control are temperature and the receiving user's receiving antenna gain. Otherwise, the minimum power required to properly decode information from a transmitter may be used as a means of guaranteeing physical access to the various data types.

According to one feature, the −77 dBm limit for the first data type 601 is the minimum receiver power of typical 802.11n radios on the market that transmit at 300 mbit/s. The other data type power levels and ranges are determined from this data point using the Friis transmission equation, represented by the curve 610. According to one embodiment, the ranges discussed with respect to Equation (1) may change slightly due to scattering. In another embodiment, the transmitter power may be higher, but the protocol ensures that the receiver power threshold is set above the corresponding limit.

In some embodiments, different types of data are transmitted at different power levels so that the signals can only reach specific and different distances (e.g., due to ambient temperature or noise ratio). For example, in FIG. 3, the first data type 320 may be transmitted at a lower power level so that the signals only reach a short distance (e.g., the communication range 330). The second data type 321 may be transmitted at a somewhat higher power level so that the signals can reach a somewhat longer distance (e.g., the communication range 331). The third data type 322 may be transmitted at an even higher power level so that the signals can reach a farther distance (e.g., the communication range 332). These power levels may be dynamically controlled by a power amplifier, or using the dynamic range of the digital to analog converters.

Figure 7:
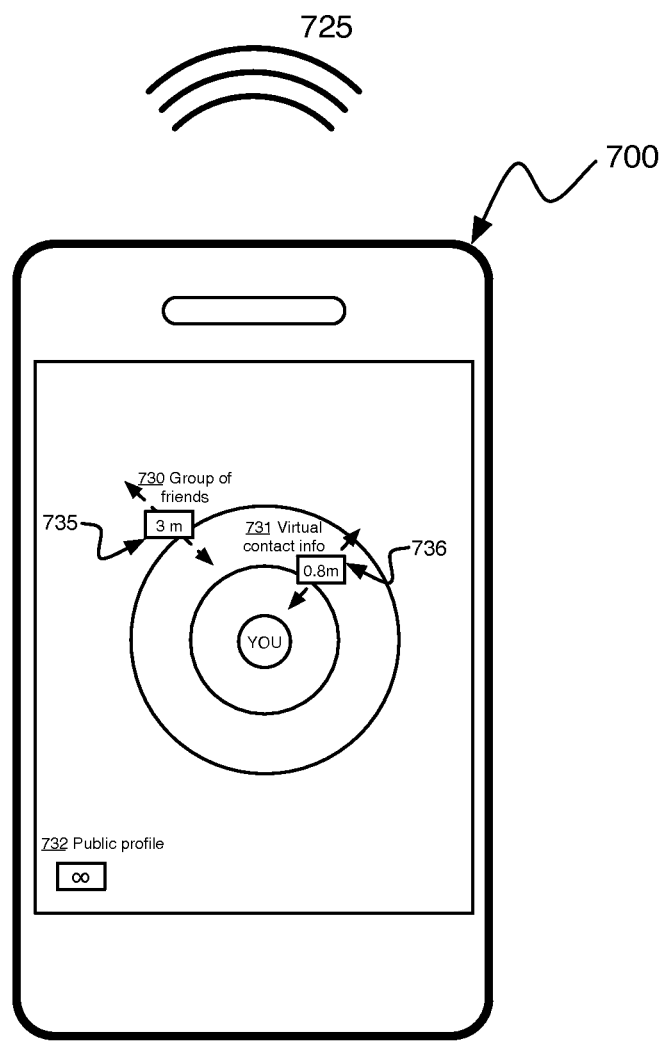
FIG. 7 illustrates an example user interface for controlling transmission ranges.

FIG. 7 is a diagram of a user interface element that may be used to control the communication ranges for the different data types on a mobile communication device. The user can control the zones of communication 725 corresponding to the first data type and the second data type. According to one embodiment, the third data type may be broadcast using the same radio, and the third data type may also be broadcast widely using WAN technology connected to the internet such as a cellular modem or WiFi. Thus, the communication range of the third data type may be considered as infinite or global. As shown in FIG. 7, the range of the first data type, shown here as Virtual contact info 731 has a control distance 736 that can be dynamically changed using a touch screen or other user interface control. The radius of communication may update live on the screen as a user changes this parameter. The user may also add or subtract the types of information that may be shared within the first distance 731. Similarly, the second data type, shown in FIG. 7 as Group of friends 730, has a control distance 735 that can be dynamically changed. In one embodiment, a set of profiles for various social settings may be defined by a user and the user may switch between the settings, or the communication device may automatically switch setting based on location-awareness.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method comprising:
by a primary communication device, identifying a plurality of data types;
by the primary communication device, identifying a plurality of communication ranges for data transmission, wherein a first communication range of the plurality of communication ranges is less than a second communication range of the plurality of communication ranges, and wherein the first communication range corresponds to a first data type of the plurality of data types and the second communication range corresponds to a second data type of the plurality of data types;
by the primary communication device, transmitting data in the first data type to a first wireless communication device located within the first communication range, wherein the data in the first data type is transmitted using a first bandwidth based on the first communication range; and
by the primary communication device, transmitting data in the second data type to a second wireless communication device located within the second communication range, wherein the data in the second data type is transmitted using a second bandwidth based on the second communication range, the second bandwidth being lower than the first bandwidth, and wherein the data in the first data type is undecodable by the second wireless communication device at the second communication range.

2. The method of claim 1, wherein:
the data in the first data type and the data in the second data type are transmitted simultaneously;
the data in the first data type are transmitted at a first power level; and
the data in the second data type are transmitted at a second power level greater than the first power level.

3. The method of claim 2, further comprising:
by the primary communication device, receiving first feedback information from the first wireless communication device;
by the primary communication device, receiving second feedback information from the second wireless communication device;
by the primary communication device, adjusting the first power level based on the first feedback information; and
by the primary communication device, adjusting the second power level based on the second feedback information.

4. The method of claim 1, further comprising:
by the primary communication device, encoding the data in the first data type using a first encoding format; and
by the primary communication device, encoding the data in the second data type using a second encoding format.

5. The method of claim 4, wherein the data in the first data type and the data in the second data type are encoded by an Orthogonal Frequency Division Multiplexing (OFDM) encoder configured to convert a bit stream of data to a set of orthogonal signals.

6. The method of claim 5, further comprising transmitting the set of orthogonal signals simultaneously.

7. The method of claim 1, wherein:
the data in the first data type is only decodable by the first wireless communication device; and
the data in the second data type is only decodable by the first and second wireless communication devices.

8. The method of claim 1, further comprising:
by the primary communication device, transmitting data in a third data type, wherein the data in the third data type is only decodable by the first and second wireless communication devices and a third wireless communication device located within a third communication range, wherein the third communication range is greater than the second communication range.

9. The method of claim 8, wherein:
the data in the first, second, and third data types are transmitted simultaneously by the primary communication device;
the data in the first data type is undecodable by the third wireless communication device; and
the data in the second data type is undecodable by the third wireless communication device.

10. The method of claim 8, wherein the data in the third data type is transmitted using a third bandwidth, the third bandwidth being lower than the second bandwidth.

11. A wireless communications device comprising:
a transmitter configured to:
transmit data in a first data type to a first wireless communication device located within a first communication range, wherein the data in the first data type is transmitted using a first bandwidth based on the first communication range; and
transmit data in a second data type to a second wireless communication device located within a second communication range, wherein the data in the second data type is transmitted using a second bandwidth based on the second communication range, the second bandwidth being lower than the first bandwidth, and wherein the data in the first data type is undecodable by the second wireless communication device at the second communication range; and
a receiver configured to receive data transmitted from the first communication device and the second communication device.

12. The wireless communications device of claim 11, further comprising an encoder configured to encode the data in the first data type and the data in the second data type.

13. The wireless communications device of claim 12, wherein the encoder is an Orthogonal Frequency Division Multiplexing (OFDM) encoder configured to convert a bit stream of data to a set of orthogonal signals.

14. The wireless communications device of claim 13, wherein the transmitter is further configured to transmit the set of orthogonal signals simultaneously.

15. The wireless communications device of claim 11, wherein:

the data in the first data type and the data in the second data type are transmitted simultaneously;

the data in the first data type are transmitted at a first power level; and the data in the second data type are transmitted at a second power level greater than the first power level.

16. The wireless communications device of claim 15, wherein:
the receiver is further configured to:
receive first feedback information from the first wireless communication device; and
receive second feedback information from the second wireless communication device; and
the transmitter is further configured to:
adjust the first power level based on the first feedback information; and
adjust the second power level based on the second feedback information.

17. The wireless communications device of claim 11, wherein:
the data in the first data type is only decodable by the first wireless communication device; and
the data in the second data type is only decodable by the first and second wireless communication devices.

18. The wireless communications device of claim 11, wherein the transmitter is further configured to:
transmit data in a third data type, wherein the data in the third data type is only decodable by the first and second wireless communication devices and a third wireless communication device located within a third communication range, wherein the third communication range is greater than the second communication range.

19. The wireless communications device of claim 18, wherein:
the data in the first, second, and third data types are transmitted simultaneously by the transmitter;
the data in the first data type is undecodable by the third wireless communication device; and
the data in the second data type is undecodable by the third wireless communication device.

20. The wireless communications device of claim 18, wherein the data in the third data type is transmitted using a third bandwidth, the third bandwidth being lower than the second bandwidth.

21. A method comprising:
sending, by a first wireless device, first data, wherein the first data are only decodable by one or more second wireless devices within a first distance from the first wireless device, and the first data are sent using a first bandwidth based on the first distance; and
sending, by the first wireless device, second data, wherein the second data are only decodable by the one or more second wireless devices and one or more third wireless devices within a second distance from the first wireless device, the second distance being greater than the first distance, and the second data are sent using a second bandwidth based on the second distance, the second bandwidth being lower than the first bandwidth.

22. The method of claim 21, wherein the first data are undecodable by the one or more third wireless devices outside of the first distance.

23. The method of claim 21, wherein:
the first data and the second data are sent simultaneously by the first wireless device;
the first data are sent at a first power level; and
the second data are sent at a second power level greater than the first power level.

24. The method of claim 23, further comprising:
by the first wireless device, receiving first feedback information from one of the second wireless devices;
by the first wireless device, receiving second feedback information from one of the third wireless devices;
by the first wireless device, adjusting the first power level based on the first feedback information; and
by the first wireless device, adjusting the second power level based on the second feedback information.

25. The method of claim 21, further comprising:
encoding, by the first wireless device, the first data using a first encoding format; and
encoding, by the first wireless device, the second data using a second encoding format.

26. The method of claim 25, wherein the first data and the second data are encoded by an Orthogonal Frequency Division Multiplexing (OFDM) encoder configured to convert a bit stream of data to a set of orthogonal signals.

27. The method of claim 26, further comprising transmitting the set of orthogonal signals simultaneously.

28. The method of claim 21, further comprising:
by the first wireless device, associating a first data type with the first distance, wherein any data of the first data type sent by the first wireless device are only decodable by the one or more second wireless devices within the first distance from the first wireless device; and
by the first wireless device, associating a second data type with the second distance, wherein any data of the second data type sent by the first wireless device are only decodable by the one or more second wireless devices and the one or more third wireless devices within the second distance from the first wireless device.

29. The method of claim 21, further comprising sending, by the first wireless device, third data, wherein the third data are only decodable by the one or more second wireless devices, the one or more third wireless devices, and one or more fourth wireless devices within a third distance from the first wireless device, the third distance being greater than the second distance.

30. The method of claim 29, wherein:
the first data, the second data, and the third data are sent simultaneously by the first wireless device;
the first data are undecodable by the one or more fourth wireless devices outside of the first distance; and
the second data are undecodable by the one or more fourth wireless devices outside of the second distance.

31. The method of claim 29,
wherein the third data are sent using a third bandwidth lower than the second bandwidth.

* * * * *